US012350227B2

(12) United States Patent
Bell

(10) Patent No.: US 12,350,227 B2
(45) Date of Patent: Jul. 8, 2025

(54) BUBBLE MASSAGE FLOAT APPARATUS AND METHOD

(71) Applicant: Michael Bell, Port Saint Lucie, FL (US)

(72) Inventor: Michael Bell, Port Saint Lucie, FL (US)

( * ) Notice: Subject to any disclaimer, the term of this patent is extended or adjusted under 35 U.S.C. 154(b) by 0 days.

(21) Appl. No.: 18/418,575

(22) Filed: Jan. 22, 2024

(65) Prior Publication Data

US 2024/0156678 A1 May 16, 2024

(51) Int. Cl.

*A61H 33/02* (2006.01)
*A61H 33/00* (2006.01)
*A61H 37/00* (2006.01)

(52) U.S. Cl.

CPC ......... *A61H 33/025* (2013.01); *A61H 33/028* (2013.01); *A61H 37/005* (2013.01); *A61H 2033/0058* (2013.01); *A61H 2201/0207* (2013.01); *A61H 2201/102* (2013.01)

(58) Field of Classification Search

CPC .... A63H 23/10; A61H 33/025; A61H 33/028; A61H 37/005; A61H 2033/0058; A61H 2201/0207; A61H 2201/102; A47K 3/06; B63B 7/08; B63B 34/52; B63B 34/50; B63B 34/00; B63B 34/23; B63B 34/22; A47C 15/006; B63C 9/30; F24H 3/062; A63B 2225/605; A63B 2225/60

USPC .......... 441/129; 472/129; 601/155–158, 160, 601/163

See application file for complete search history.

(56) References Cited

U.S. PATENT DOCUMENTS 3,636,944 A * 1/1972 Bryant ................. A61H 33/025 601/16
3,750,656 A * 8/1973 Vaughan .............. A61H 33/025 601/167
4,430,762 A * 2/1984 Marshall ................ A61H 33/60 601/167
4,756,032 A * 7/1988 Wang ..................... E04H 4/0025 4/588
5,088,723 A * 2/1992 Simmons ............. A61H 37/005 441/130
5,176,554 A * 1/1993 Simmons ................ B63B 34/52 441/129

(Continued)

FOREIGN PATENT DOCUMENTS

FR 2897774 A1 * 8/2007 ............. A61H 33/02

OTHER PUBLICATIONS

English translation of Meunier (FR 2,897,774 A1) (Year: 2006).*

*Primary Examiner* — Justine R Yu
*Assistant Examiner* — Alexander Morales
(74) *Attorney, Agent, or Firm* — Lowndes; Stephen C. Thomas; Robert R. Fredeking

(57) ABSTRACT

An apparatus and method for providing therapeutic bubbling massage of a person's body. The apparatus may be adapted to float on, for example, a pond, lake or pool. The apparatus may be formed of an inflatable bladder having an interior volume that is pressurized with air. The weight of a user disposed on the upper surfaces of the inflatable bladder may force a portion of the bladder below the surface of the fluid in which the apparatus is floating, such that bubbles are formed when the pressurized gas is allowed to escape the bladder through openings impacting the body of the user. The gas may be heated or may be infused with an aroma.

8 Claims, 13 Drawing Sheets

(56) References Cited

U.S. PATENT DOCUMENTS

| | | | | | |
|---|---|---|---|---|---|
| 5,307,529 | A * | 5/1994 | Wang | A61H 33/025 | 4/585 |
| 6,669,658 | B2 * | 12/2003 | Fumanelli | A61H 33/02 | 601/158 |
| 2002/0148911 | A1 * | 10/2002 | Beck | A61H 33/60 | 239/310 |
| 2012/0297530 | A1 * | 11/2012 | Huang | A61H 33/028 | 4/493 |
| 2021/0068550 | A1 * | 3/2021 | de Grasse | A47C 27/081 | |

* cited by examiner

BUBBLE MASSAGE FLOAT APPARATUS AND METHOD

CROSS REFERENCE TO RELATED APPLICATIONS AND INCORPORATION BY REFERENCE

This non-provisional patent application is a continuation of, and claims benefit of priority to, U.S. Non-Provisional patent application Ser. No. 17/867,271, filed in the United States Patent and Trademark Office (USPTO) on Jul. 18, 2022, entitled BUBBLE MASSAGE FLOAT APPARATUS AND METHOD, which is set to issue as U.S. Pat. No. 11,877,980 on Jan. 23, 2024, the entire disclosure of which is incorporated herein by reference.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to devices, systems and methods for providing pleasing or therapeutic massaging effect, or both, through the application of air bubbles to the epidermis of one or more users, utilizing a floating apparatus that may be disposed in or on a body of water such as a pond, lake or pool. The air bubbles may be diffused. The air forming the bubbles may be heated, or scented, as desired by the user.

2. Background Art

There have been, over time, certain systems and devices that utilize moving water, but not bubbling air, to provide therapy to a user, such as in hydrotherapy. However, hydrotherapy uses jets or streams of water to impact a user, as opposed to the air bubbles of the present invention, and therefore is not the same as the bubble massage therapy of the present invention. U.S. Pat. No. 3,092,101 to Kinney, issued Mar. 19, 1962, discloses a portable pool arrangement, with water pumps for circulating water, that allows a user to sit above the moving water and extend their extremities into the moving water.

U.S. Pat. No. 4,126,905 to Russell et al., issued on Nov. 28, 1978, discloses a floating spa that circulates water within the floating spa. This system, however, is not portable, nor does it provide air bubbling directing at the user's epidermis, nor does it place the user directly in the body of water in which the portable spa is disposed. U.S. Pat. No. 4,149,281 to Bob et al., issued Apr. 17, 1979, also describes a floating spa, with the same shortcomings as U.S. Pat. No. 4,126,905 to Russell et al.

U.S. Pat. No. 4,468,822 to McKay, issued Sep. 4, 1984, discloses a floating frame for expelling a liquid to a person supported by the frame. However, U.S. Pat. No. 4,468,822 does not teach bubbling a gas, such as air, to create a bubbling massage effect on the user.

U.S. Pat. No. 4,986,781 to Smith, issued Jan. 22, 1991, discloses a floating lounge that utilizes a liquid distribution chamber for delivering small jets of fluid under pressure to the body of a user. However, U.S. Pat. No. 4,986,781 does not teach delivering bubble massage therapy via bubbling of a gas from the tubing of a frame.

U.S. Pat. No. 6,746,293 to Kirby, Jr., et al., issued Jun. 8, 2004, discloses a floating, steerable spa chair having spa jets that direct a stream of water towards a user. However, U.S. Pat. No. 6,746,293 does not disclose delivering bubble massage therapy via bubbling of a gas from the tubing of a frame.

International patent application PCT/CH2015/000188, published by the World Intellectual Property Organization (WIPO), as WO 2016/095063 A1 on Jun. 23, 2016, discloses a chair rotably mounted to the sidewall of a pool that directs water to a user. However the teachings of WO 2016/095063 A1 do not disclose a floating frame, or delivering bubble massage therapy via bubbling of a gas from the tubing of a frame.

Air bubble massage therapy has a therapeutic effect on a user that are, in many respects is superior to hydrotherapy. Such therapeutic effects include, for example, increase in blood flow of the epidermis and other body portions of a user, improvement in peripheral circulation, increased oxygen saturation of tissues and organs. Further, body tissue swellings are reduced, skin is thoroughly moisturized and its vitality is restored. Still further, regular treatments of air bubble massage has a positive effect on reducing cellulite. In addition, air bubble massage may be indicated for those who suffer from functional mental disorders, or experience frequent stress and mental tension. Air bubble massage may help relieve painful body sensations, neurotic state, and relax muscles, and may be useful to reduce insomnia and to produce the normalization of blood circulation.

What is needed in the art, therefore, is an apparatus and/or method adapted to directly provide the benefits of gas, e.g. air, bubble massage therapy to a user; that is portable so that it may easily be transported between bodies of water, or stored during periods of non-use; and is adapted to support a user's body while the user disposed on the apparatus, while at the same time providing bubble massage therapy to the epidermis of a user.

BRIEF SUMMARY OF THE INVENTION

The present invention comprises a system, an apparatus and a method that have one or more of the following features and/or steps, which alone or in any combination may comprise patentable subject matter, and which may provide the benefits of air bubble massage, overcome the aforementioned shortcomings in the prior art, and improve the current state of the art.

The present invention is a bubble massage float system, apparatus and method for providing soothing, bubbling air or gas massage of a person's epidermis and, in embodiments, muscles, providing a relaxing experience for the user. The apparatus of the present invention does not utilize streams or jets of liquid for creating a massage effect on a user, such as is done in hydrotherapy. The apparatus may be adapted to float on a body of fluid, such as water, for example, a pond, lake or pool, or any other body of water. The apparatus may comprise pressurized pneumatic tubing or an inflatable bladder having an interior volume that is pressurized with a gas such as, for example, air. In embodiments, the pneumatic tubing may form a frame allowing one or more users to sit, lie, recline or otherwise be disposed on upper surfaces of the pneumatic tubing, such that openings in the pneumatic tubing may allow the gas, e.g., air, to escape in the form of bubbles that move through the water, and impact the skin, or epidermis, of a user, causing a therapeutic bubble massage effect on the user. The apparatus may comprise flotation elements such as open cell or closed cell foam or expanded plastic, or inflatable elements, enabling the apparatus to float, or partially float, in a body of water when a user is disposed on the apparatus such that the floating apparatus is bearing the at least some, or all, of the weight of the user. In embodiments, the weight of the user who is disposed on the upper surfaces of the pneumatic tubing or inflatable bladder may force a portion of the apparatus, including at least a portion of the pneumatic tubing or inflatable bladder, below the surface of the water in which the apparatus is floating, such that bubbles are formed when the pressurized gas is allowed to escape the pneumatic tubing or inflatable bladder through the openings in the pneumatic tubing or inflatable bladder. The escaping gas forms bubbles in the fluid in which the apparatus is floating. The bubbles move upward through the fluid, impacting the body of the user, providing a soothing, bubbling massage of a person's epidermis and, in embodiments muscles, providing a relaxing experience for the user.

In embodiments, the apparatus may comprise an input port for receiving pressurized gas into the pneumatic tubing or inflatable bladder. In embodiments, the pressurizing gas may pass through a heater, an aroma dispenser, or both, in any order, before it pressurizes the pneumatic tubing such that the pressurized gas forms heated bubbles, or scented bubbles, or both, that impact the user's body. In this manner the apparatus may provide soothing heat therapy and aroma therapy as well as massage sensation and bubble massage therapy to the user.

In embodiments, the invention may comprise a system for providing bubble massage to the epidermis of a user, comprising a floating bubble massage apparatus, comprising at least one flotation element and at least one bubbling tubing element; wherein the at least one bubbling tubing element is in pneumatic communication with an air blower for pressurizing the at least one bubbling tubing, and the bubbling tubing element comprises openings for producing air bubbles when the bubbling tubing element is pressurized by the air pump and submerged in an liquid; and wherein the at least one flotation element is attached either directly or indirectly to the bubbling tubing element. When a user is disposed upon the floating bubble massage apparatus and the floating bubble massage apparatus is disposed on a body of water, at least a portion of the at least one bubbling tubing element is disposed and submerged in said water, such that the air bubbles escaping from the at least one bubbling tubing element through the openings impact and rise along a portion of an epidermis of the user as they rise towards a surface of the water.

In embodiments, the inventive system may further comprise an air heater positioned between, and in pneumatic communication with, the air blower and the bubbling tubing, wherein air from the air blower is passed through the air heater before passing into the bubbling tubing, heating said air bubbles. The air heater may be a controllable air heater that is adapted to maintain a temperature of the air from the blower in a range between a desired lower heated temperature and a desired upper heated temperature.

In embodiments, the inventive system may further comprise an aroma infuser positioned between, and in pneumatic communication with, the air blower and the bubbling tubing elements, wherein air from the air blower is passed through a basket or other flow-through structure containing one or more scented elements, such that the air absorbs scent from the scented elements and becomes scented air before passing into the bubbling tubing elements.

In embodiments, the at least one bubbling tubing element maybe be further defined as a plurality of bubbling tubing elements. The plurality of bubbling tubing elements may be in pneumatic communication with the air blower via pneumatic tubing. At least some of said plurality of bubbling tubing elements comprise quick disconnect pneumatic connectors for quick and easy break down and storage of the bubble massage float apparatus.

In embodiments, the inventive system and apparatus may further comprise a bubbling loop member in pneumatic communication with the air blower, that may act as a therapeutic bubbling massage headrest providing bubble massage therapy to a user's head and neck.

In embodiments, the flotation elements may further be defined as comprising closed-cell plastic foam, and they may be removably attached to at least one bubbling tubing element or pneumatic tubing element.

In embodiments, the inventive system may comprise a plurality of bubbling elements.

In embodiments, the inventive system may comprise a plurality of bubbling elements each having a first end and a second end, and wherein each of the first ends of each bubbling tubing element of the plurality of bubbling elements may be in direct pneumatic communication with a first pneumatic tubing, and wherein each of the second ends of each bubbling tubing element of the plurality of bubbling elements may be in direct pneumatic communication with a second pneumatic tubing such that the first and second pneumatic tubing are pneumatically connected by the pneumatic connections of the bubbling tubing elements, forming a ladder arrangement, wherein the first pneumatic tubing and the second pneumatic tubing are in communication with the air blower through a manifold.

In embodiments, at least one of the plurality of bubbling elements has a longitudinal axis that is curvilinear in shape.

In embodiments, the invention may comprise a first portion of pneumatic tubing and a second portion of pneumatic tubing, and a plurality of bubbling tubing elements; and wherein each bubbling tubing element of the plurality of bubbling tubing elements is pneumatically attached on a first end to the first portion of pneumatic tubing, and wherein each bubbling tubing element of the plurality of bubbling tubing elements is pneumatically attached on a second end to the second portion of pneumatic tubing, such that the plurality of bubbling tubing elements and the first and second pneumatic tubing form a ladder configuration; and wherein the at least one flotation element is further defined as a first flotation element and a second flotation element, the first flotation element attached to the first pneumatic tubing and the second flotation element attached to the second pneumatic tubing; wherein the first pneumatic tubing and the second pneumatic tubing are in pneumatic communication with the air pump via a manifold.

In embodiments, the inventive system and apparatus may comprise a bubbling loop member in pneumatic communication with the air blower.

In embodiments, the flotation elements may be further defined as comprising any material that has a density less than water, such as, for example, closed-cell plastic foam, expanded plastic, or inflatable vinyl or PVC.

In embodiments, the inventive system and apparatus may comprise an inflatable bladder having an enclosed interior volume that is in pneumatic communication with an air pump or blower for pressuring the enclosed interior volume.

In embodiments, pressurized air may escape the enclosed interior volume of the pressurized inflatable bladder, or pressurized bubbling tubing, via one or more air diffusers.

The invention provides certain improvements over the systems and devices of the prior art, some of which are set forth in the description, drawings and appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating exemplary embodiments of the invention and are not to be construed as limiting the invention. In the drawings.

Figure 1:
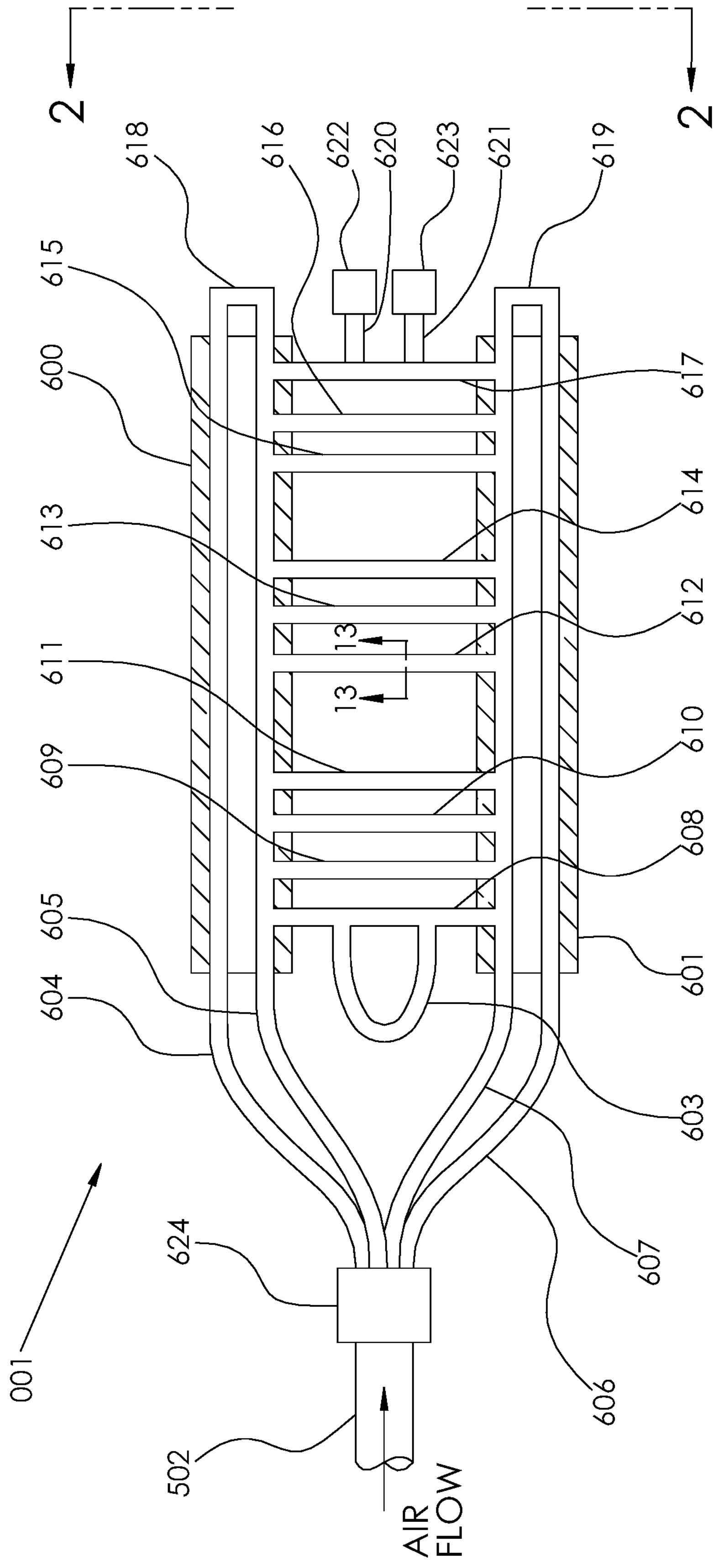
FIG. 1 depicts a top view of an embodiment of the bubble massage float apparatus of the invention.

In the drawings, like reference numbers refer to like items. In the drawings, a particular relative sizing of elements may be depicted; however, the relative sizing and scale of elements depicted in the drawings are not intended to be limiting unless, and only to the extent, they are set forth in the claims or the written description. It is within the intended scope of the invention and this disclosure to include all relative sizes and scales of elements, without limitation, that operate as described and claimed herein.

DETAILED DESCRIPTION OF THE INVENTION

The following documentation provides a detailed description of the invention.

Although a detailed description as provided in this application contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given.

As used herein, "upward" and "up" mean opposite the direction of gravity; i.e. the direction that bubbles travel when released in a fluid such as water.

As used herein, "pneumatic tubing" includes within its meaning any tubing, or elongate structure, that comprises an lengthwise interior volume that is capable receiving a compressed gas, such as air, such that the interior volume is able to be pressured to pressures that are higher than atmospheric pressures if air is not allowed to escape the tubing, such as for example, if the open ends of the elongate structure are sealed, or closed, such that no gas may escape when the pneumatic tubing, or if flow of gas out of the open ends, or any openings or holes of the tubing, such as, for example, bubbling openings 802 in the figures, is restricted such that a desired input volumetric air flow raises the gas pressure inside the tubing over atmospheric pressure and maintains the raised pressure while allowing a desired volume of gas to escape the tubing through openings in the tubing, such as end opening that are connected to other pneumatic elements, and bubbling openings such as bubbling opening 802. Pneumatic tubing may be of any cross-sectional shape taken in a plane transverse to a longitudinal axis of the elongate structure such as, for example, circular, oval, square, rectangular or any other cross-sectional shape. Pneumatic tubing may be rigid or flexible, and may be comprised of plastic or any other material suitable for the functions and features of the pneumatic tubing described and shown herein.

As used herein, "in pneumatic communication" includes within its meaning that a gas, such as air, which may be pressurized, is able to be communicated between two elements either directly, such as when the two elements are directly connected via pneumatic hose or tubing, or indirectly, such as when the two elements are a part of the same serially connected group of elements but they are not directly connected together. In other words, in a serially pneumatically connected chain of elements A-B-C, element A may be said to be pneumatically connected to element C, even though element B is interposed between element A and C such that element A is not directly connected to element C. In this example, element A is directly connected to element B, and element B is directly connected to element C. However, element A is in pneumatic communication with both element B and element C; element B is in pneumatic communication with both element A and element C; and element C is in pneumatic communication with both element A and element C. And so on, for any number of serially connected elements.

As used herein "pressurize" and "pressurized" mean achieving a pressure of a gas contained within an enclosed interior volume that is greater than 14.7 pounds per square inch. In embodiments, as an example, "pressurize" and "pressurized" may mean achieving a pressure of a gas contained within an enclosed interior volume that is within a range of 14.7 PSI to 35 PSI.

As used herein, "PSI" means pounds per square inch pressure.

As used herein, "bubbling element" includes within its meaning any structure such as pneumatic tubing having an interior volume, and having bubbling holes or bubbling openings such as, for example, bubbling openings 802 in the figures, allowing a pressurized gas occupying the interior volume to escape the interior volume, forming bubbles when the structure is at least partially submerged in a fluid such as water. The size of the bubbling openings may be selected to achieve a desired bubble size. Items 603, 608-617, and 206 are non-limiting examples of bubbling elements.

As used herein, "element" and "member" may be used interchangeably to refer to a feature.

Referring now to FIG. 1, a top view of an exemplary embodiment of the bubble massage float apparatus of the invention 001 is depicted. In its most basic form, pressured gas, such as air, provided by pneumatic tubing 502 enters manifold 624. Manifold 624 may divide the pressurized air into one or more output tubing 604, 605, 606 and 607. In an embodiment, manifold 624 may be adapted to provide the same pressure in each output tubing 604, 605, 606 and 607. However, in embodiments, the bubble massage float apparatus may comprise flow restrictors or pressure regulators, or both, in manifold 624 or in any of the output tubing 604, 605, 606 and 607 in order to select pressure and flow rate for the pressurized gas in each output tubing 604, 605, 606 and 607 in order to achieve a desired bubbling effect from the bubbles escaping the various elements of bubble tubing comprising the invention. Thus, it may be possible, for example, to provide greater bubbling effect impacting a first portion of a user's epidermis, and lesser bubbling effect impacting a second portion of a user's epidermis, and so on, up to any number of portions of user epidermis, so as to provide individualized levels of bubbling effect on a plurality of portions of a user's epidermis. Furthermore, while manifold 624 is shown as a 1:4 splitter of incoming air flow in pneumatic tubing 502, it is to be understood that it is within the scope of the intended invention that manifold 624 may provide any splitting ratio 1:2, 1:3, 1:4, 1:5, 1:6 or any other ratio. The splitting ratio may be selected to provide pressurized gas to any number of output tubing elements, in any configuration, in order to provide a desired bubbling effect on a user's epidermis.

Still referring to FIG. 1, it is an object of the bubble massage float apparatus of the invention to provide pressurized gas, such as air, to the bubbling tubing elements of the invention. These bubbling tubing elements, in embodiments, may become submerged under water when a user is disposed upon the bubble massage float apparatus. The bubbling tubing elements may be formed from pneumatic tubing having openings for allowing the pressurized gas, such as air, escape to form bubbles that rise upward, i.e., toward the surface of the water upon which the bubble massage float apparatus of the invention is disposed. When the bubbling tubing elements are pressurized, pressurized gas, such as air, inside the tubing escapes from one or more, and preferably a plurality, of openings in the bubbling tubing elements toward the surface of the water, impacting and rising along the epidermis of the user, resulting in a relaxing bubble massage effect on the user's epidermis. In the non-limiting exemplary embodiment of the bubble massage float apparatus depicted in FIG. 1, pneumatic tubing 604 and 605 are in pneumatic communication on their distal ends via pneumatic tubing 618, and pneumatic tubing 606 and 607 are in pneumatic communication on their distal ends via pneumatic tubing 619. Pneumatic tubing 604 and 605 may be contained within a first flotation element 600 extending along a first side of the bubble massage float apparatus, and pneumatic tubing 606 and 607 may be contained within a second flotation element 601 extending along a second side of the bubble massage float apparatus. Flotation elements 600 and 601 may comprise any material that is of lower density than water. Exemplary embodiments of flotation elements 600 and 601 comprise closed-cell plastic foam materials, such as expanded foam, expanded polystyrene, Styrofoam, encased Styrofoam, hollow volumetrically sealed plastic floats, polyethylene foam, cross-linked polyethylene, ethylene-vinyl acetate (EVA) foam, inflatable PVC or vinyl bladders, or any other material suitable for a flotation element as is known in the art. In embodiments, flotation elements 600 and 601 may comprise inflatable bladders. Although two flotation elements 600 and 601 are depicted in the drawings, the bubble massage float apparatus may comprise any number of flotation elements, including one or a plurality, or none, as may be required to be operable such that, when a user is disposed on the bubble massage float apparatus when the bubble massage float apparatus is floating on the surface of a body of water, the bubbling elements of the bubble massage float apparatus are submerged at a desired level such that the escaping rising gas impacts and rises along the epidermis of user so as to provide a desired soothing and therapeutic bubble massage effect on the epidermis of the user. In embodiments, the flotation elements may be removably attached to the pneumatic tubing so that flotation elements may be interchanged, added, or removed to provide the desired level of flotation so as to achieve the aforementioned desired soothing bubble massage effect on the epidermis of the user. If too much flotation is used, the user will ride high in the water, reducing or even eliminating the desired soothing bubble massage effect on the epidermis of the user. If too little flotation is used, the user will ride low in the water, or even sink, which is undesirable as the user cannot remain disposed on the bubble massage float apparatus. In embodiments, when the correct amount of flotation is provided by the flotation elements (the "desired level of float", the lower body surfaces of the user will be disposed under the surface level of the water (depicted as 800 in FIGS. 3, 5 and 6), pushing the bubble elements, which may comprise bubble, or bubbling tubing, down, below the surface of the user, such that escaping rising gas rises from the openings in the bubbling tubing, impacting and rising along at least a portion of the epidermis of the user so as to provide a desired therapeutic and soothing bubble massage effect on the epidermis of the user. The size, material, composition, shape and configuration of flotation elements 600 and 601 may be selected to achieve a desired level of float of the user in the water. At least one flotation element may, in embodiments, be directly or indirectly attached to a bubbling element. Indirect attachment of a flotation element 600 or 601 to a bubbling element such as bubbling tubing 608-617 may be accomplished by attaching a flotation element 600 or 601 to a structure that is attached to one or more of bubbling tubing 608-617. For example, the attachment of flotation element 600 to first pneumatic tubing element 605, where first pneumatic tubing element 605 is also attached to a bubbling element 608 (for example, as depicted in FIG. 1), is an indirect attachment of flotation element 600 to bubbling tubing element 608. In embodiments, bubbling elements 608-617 and 603 may comprises bubble, or bubbling, tubing 801.

Figure 3:
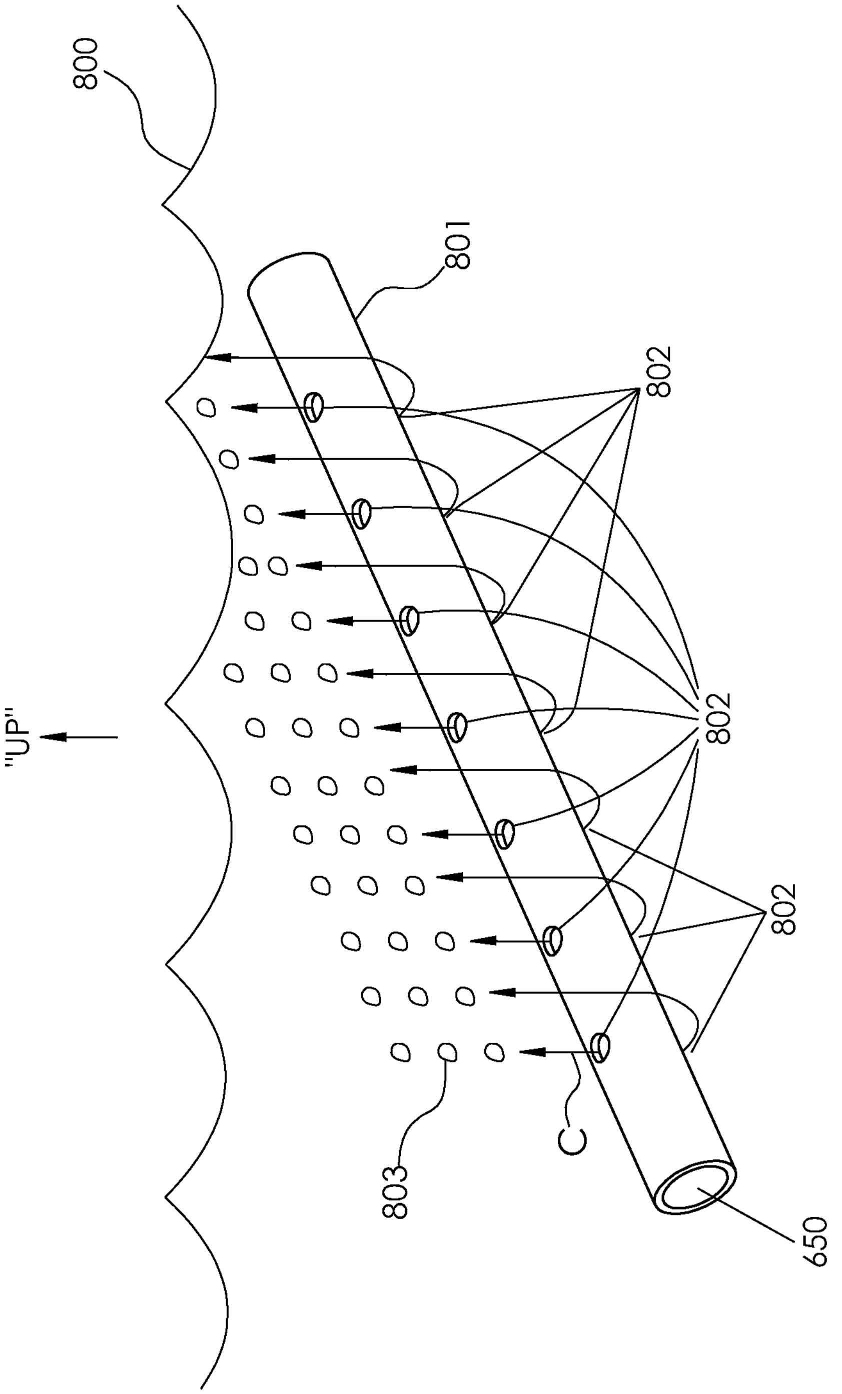
FIG. 3 depicts an exemplary portion of the pressurized bubbling tubing of the invention, showing bubbles 803 escaping the pressurized bubbling tubing 801 and rising towards the surface of the water in which the tubing is submerged.

Still referring to FIG. 1, pneumatic tubing 605 and 607 may be in pneumatic communication via one or more bubbling connecting tubing members such as, for example, tubing members 608-617. These connecting tubing members may be comprise bubble tubing 801 as depicted in FIG. 3 and described below in relation to FIG. 3. The bubble massage float apparatus may comprise any number of bubbling connecting members: the number, length, and configuration of the bubbling connecting members depicted in FIG. 1 is only exemplary. It is not necessary that all bubbling connecting members comprise bubble tubing 801. A forward-most bubbling connecting member 608 may be in communication with a bubbling loop member 603. Bubbling loop element 603 may comprise a length of bubble tubing 801 forming a U-shape, or loop shape as depicted, having two ends, each end in pneumatic communication with bubbling connecting member 608. Thus, when bubbling connecting member 608 is pressurized with a gas, for example air, bubbling loop member 603 is also pressurized, causing gas bubbles to escape the openings in the bubble tubing comprising bubbling loop member 603. When a user reclines on the upper surfaces of the bubble massage float apparatus, facing upward, i.e. lying on the bubble massage float apparatus with their back resting on the upper surfaces of the bubble massage float apparatus, they may rest their head on bubbling loop element 603. Bubbling loop member 603 may thus both support the head of the user, and massage the head and neck of the user as gas escapes openings in the bubble tubing 801 that comprises bubbling loop member 603. Thus, in embodiments, the system and apparatus of the invention may comprise a plurality of bubbling elements 608-617 each having a first end and a second end, and wherein each of the first ends of each bubbling tubing element of the plurality of bubbling elements may be in direct pneumatic communication with a first pneumatic tubing 605, and wherein each of the second ends of each bubbling tubing element of the plurality of bubbling elements may be in direct pneumatic communication with a second pneumatic tubing 607 such that the first and second pneumatic tubing are pneumatically connected by the pneumatic connections of the bubbling elements 608-617, forming a ladder arrangement, wherein the first pneumatic tubing 605 and the second pneumatic tubing 607 are in pneumatic communication with, for example, an air blower assembly 500 (see FIG. 4) or directly with an air blower 506 through a manifold 624, via pneumatic tubing 502.

Still referring to FIG. 1, one or more pneumatic tubing stubs 620 and 621 may be in pneumatic communication with a bubbling connecting member such as bubbling connecting member 617. Preferably, but not necessarily, these stubs are in pneumatic communication with the aftermost bubbling connecting member such as bubbling connecting member 617. Each stub may have a removable cap 622 or 623 that provides a pneumatic seal when closed, but may be removable, such that air may be forced into manifold 624 from, for example, tubing such as tubing 502, for the purposes of blowing accumulated water from the pneumatic tubing and bubble tubing of the apparatus when caps 622 and 623 are removed.

Figure 2:
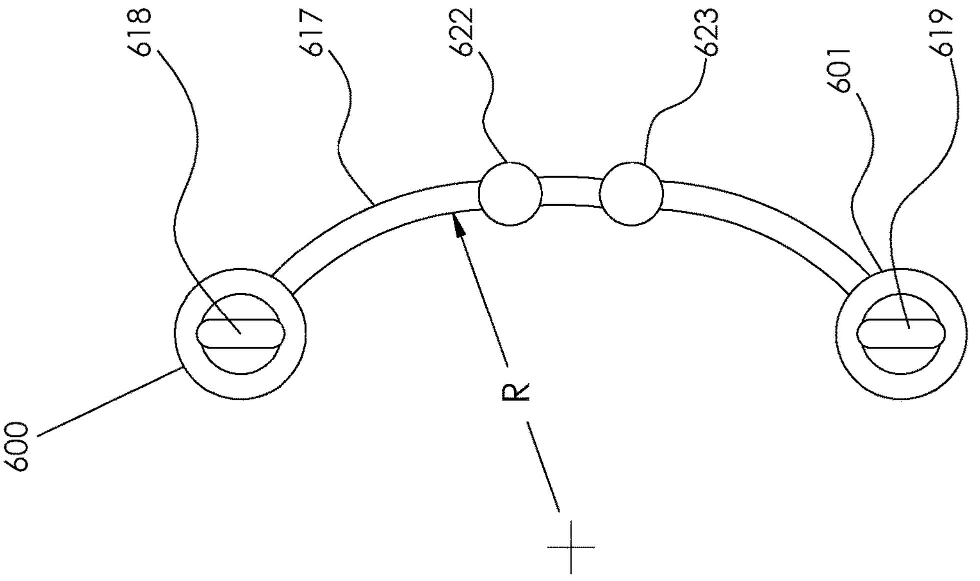
FIG. 2 depicts an end view of an embodiment of the bubble massage float apparatus of the invention, the view being take from the foot end of the apparatus.

Referring now to FIG. 2, an end view of an exemplary embodiment of the bubble massage float apparatus as shown in FIG. 1 is depicted. Flotation elements 600 and 601 are depicted. The aftermost bubbling tubing connecting member 617 is depicted, showing a curvilinear shape along a longitudinal axis of bubbling tubing connecting member 617. Each of the bubbling tubing connecting members 608-617 may, but do not necessarily, have such a curvilinear shape along their longitudinal axis. In embodiments, the curvilinear shape may arcuate or substantially arcuate, having a radius R. In embodiments, R may be in a range from 12 inches to 60 inches or greater. The curvature of bubbling tubing connecting members 608-617 allow for the body of a user to rest on the uppermost surfaces of bubbling connecting members 608-617, such that, in embodiments, the lower surface of the user's body is located below the water surface 800, such that bubbles escaping the bubble openings 802 in the bubble tubing 801 comprising the bubbling tubing connecting members 608-617 will rise in the direction of arrow C, and then impact and rise along the epidermis, or skin, of the user on their way to water surface 800. This is depicted in more detail in FIG. 5, and is described in relation to FIG. 5 below. In FIG. 2, pneumatic tubing 618, pneumatic tubing 619, removable cap 622 and removable cap 623 are shown for reference.

Referring now to FIG. 3, an exemplary view of an embodiment of a portion of a bubbling element comprising bubble, or bubbling, tubing 801 having an interior volume 650 is depicted. In use, in order to provide the beneficial bubble massage function of the invention, at least a portion of the bubbling elements of the invention that are comprised of bubble tubing 801 (for example, at least some, or all, of bubbling tubing connecting members 608-617, and bubbling loop member 603) may be comprised of bubble, or bubbling, tubing 801 that disposed below the water surface 800 by the weight of a user disposed on the bubble massage float apparatus 001. The bubbling connecting elements 608-617 (see FIG. 1), and bubbling loop element 603 (see FIG. 1), are pressurized because they are in pneumatic communication with pneumatic tubing 605 and 607 such that when blower 506, or the blower assembly 500, (see FIG. 4) are powered on, pneumatic tubing 605 and 607 (see FIG. 1) are pressurized, and, subsequently, bubbling connecting members 608-617, and optional bubbling loop member 603 (see FIG. 1) are pressurized. In embodiments, bubbling openings, or holes, 802 allow pressurized air to escape bubble tubing 801 where they travel upward, in the UP direction as depicted by arrows C, where at least a portion of escaping bubbles 803 will impact and rise along the epidermis, or skin, of the user on their way to water surface 800, creating the soothing and/or therapeutic bubbling massage effect on the epidermis of the user, which is an object of the invention. Openings, or holes, 802 in bubble tubing 801 may be oriented in any direction, but in an exemplary embodiment they are oriented in the UP direction has shown. Openings 802 may be of any shape or size that is able to produce the desired soothing bubbling massage effect on the epidermis of the user. In practice, the size of bubbling openings 802 may be selected to achieve a desired size of bubble created by gas escaping the interior volume to render a desired therapeutic effect on a user. In exemplary, non-limiting embodiments, openings 802 may be holes of between 040 and 0.187 inches in diameter, or alternatively, opening 802 may be in pneumatic communication with air diffusers 300 as described below.

Figure 4:
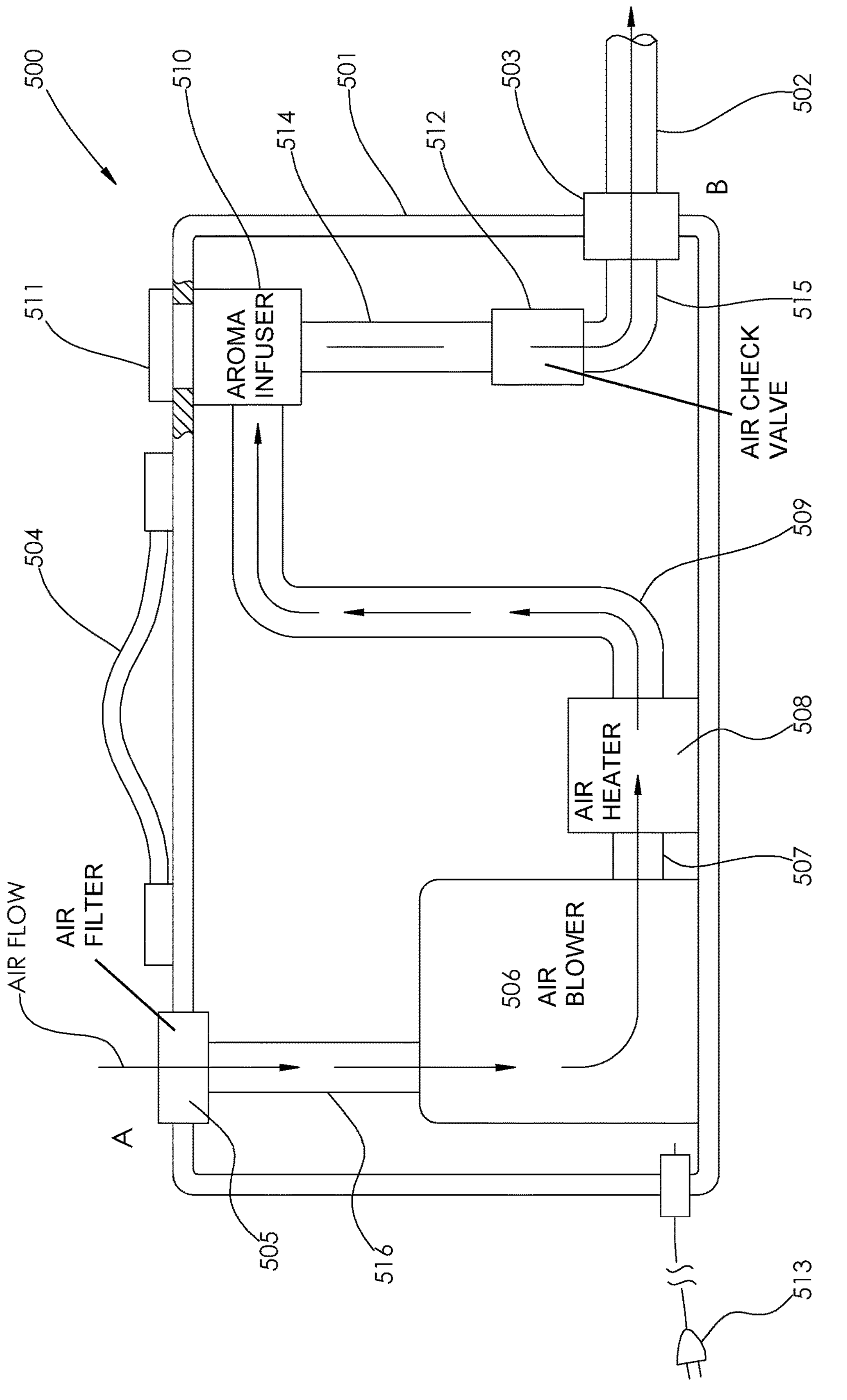
FIG. 4 depicts a view of an embodiment of a blower, or air pump, assembly that is useful to pressurize the bubbling tubing of the invention through a system of pneumatic connections.

Referring now to FIG. 4, an embodiment of an air blower assembly 500 of the invention is depicted. Air blower 506, which may comprise an electric or other type of motor having a rotating motor shaft, with a fan blade, squirrel cage or other type air-moving blade assembly attached the motor shaft, is operable, when connected an electrical power source such as 110 VAC house current, batteries, power supplies, solar panels or any other source of electric energy, to force, or blow, air in the direction of the AIR FLOW arrows, into tubing 507 that is in pneumatic communication with and between air blower 506 and air heater 508. Air may enter air blower 506 through pneumatic tubing 516 that is in communication with optional air filter 505. Optional air filter 505 may comprise a removeable filter element, and may be captured in a housing or other structure that is attached to air blower assembly enclosure 501. Thus, air may be drawn, or motivated, in the direction of the AIR FLOW arrows from outside the air blower assembly enclosure 501, into and through optional air filter 505 at point A, into and through pneumatic tubing 516 and into air blower 506 by the operation of air blower 506 when it is powered on. The air leaving air blower 506 passing into and through pneumatic tubing 507 may be, and preferably is, at a higher pressure than the environmental air outside air blower assembly enclosure 501. The invention may further comprise an electrical rheostat or other current or voltage controlling device situated electrically between the source of electric power 513 and the air blower motor for the purpose of controlling the speed of rotation of the air blower motor, and thus controlling the air flow rate though the invention and the air pressure in the pressurized pneumatic tubing, bubble tubing and other elements of the invention to achieve a desired air flow rate as may be desired by a user. In embodiments, then, the air flow rate and the pressure in the pneumatic tubing and bubble tubing of the invention are controllable by the user.

Still referring to FIG. 4, pressurized air from air blower 506 passes through pneumatic tubing 507 into optional air heater 508. Optional air heater 508 may be any air heater known in the art such as electric air heater that comprises resistive elements to exchange heat with air, gas burners that are operable to exchange heat with air, or any other type of air heater. Optional air heater 508 may be in electrical communication with a source of electric power, or may be in communication with a fuel for fueling burner elements such as, for example, LP (liquid propane) or natural gas. When optional air heater 508 is powered ON electrically (in the case of electric heating elements) or when its burners are lit (in the case of gas type heating elements), or, in any other case in which heating elements are activated, the air passing through optional air heater 508 is in thermal communication with the heating elements of optional air heater 508, and is thus heated by exchange of heat energy between the passing air the heating elements, which are at a higher temperature than the passing air. Thus, the air exiting optional air heater 508 may be at a higher temperature than the air entering exiting optional air heater 508 through pneumatic tubing 507. I.e., it is heated air, ready and available for therapeutic use when it exits the bubble tubing of the invention, bubbles upward in the body of water upon which the user and the bubble massage float apparatus are disposed, where it impacts and rises along surfaces of the epidermis of the body of the user. In embodiments, an air temperature sensor may be located so as to be in thermal communication with air that has passed through optional air heater 508. The temperature sensor may be in electrical communication with a thermostat that controls the electric current, or gas flow, through the heating elements so that when the sensed air temperature falls below a first desired level, heating of the air is initiated or increased, and when the air temperature rises above a second desired level, heating of the air is ceased or decreased. The invention may further comprise an electrical rheostat or other current or voltage controlling device situated electrically between the source of electric power and the electrical heating elements, or may comprise controllable gas flow regulators and pressure regulators situated in gas supply tubing between a source of fuel and fuel-type burner heating elements, for the purpose of controlling the amount of heat to be transferred to the pressurized air as it passes through optional air heater 508, and thus controlling the air temperature in the pressurized pneumatic tubing, bubble tubing and other elements of the invention. In embodiments, then, the air temperature in the pneumatic tubing and bubble tubing of the invention may be controllable to be in a range between a desired lower temperature and a desired higher temperature. Exemplary values for these lower and upper temperatures are 80° F. to 120° F.

Still referring to FIG. 4, the operation and function of an optional aroma infuser 510 is now described. Pressurized air from optional air heater 508 may enter into pneumatic tubing 509 and travel in the direction of the AIR FLOW into and through optional aroma infuser 510 as depicted in FIG. 4. Optional aroma infuser 510 may comprise an optional basket through which the pressurized air is forced on its way through optional aroma element 510. Optional aroma infuser 510 may also comprise an openable cover 511 that may be opened by a user such that the user may place an aroma element in the basket such that pressurized air is forced through, or in near proximity to, the basket containing the aroma element. The pressurized air, which may be heated air that has been heated by optional air heater 508, may pass through the basket where it flow over, around and between at least portions of the aroma element(s) contained in the basket, absorbing the aroma from the aroma elements as it does so. The air is now scented air carrying the aroma of the aroma elements. In embodiments, the aroma elements may be replaced by opening cover 511, removing old or depleted aroma elements from the aroma basket, and replacing them with fresh aroma elements. Cover 511 may be captured in a housing or other structure that is attached to air blower assembly enclosure 501. The pressurized air exiting optional aroma infuser 510 into pneumatic tubing 514 may thus carry the aroma of the aroma elements. I.e., it is scented air, ready and available for aroma therapy use when it exits the bubble tubing of the invention where it is sensed by the olfactory senses of the user.

Still referring to FIG. 4, air exiting optional aroma infuser 510 into pneumatic tubing 514 may be forced by air blower assembly 506 to pass through tubing 514, continuing through optional air check valve 512 in the direction shown by the AIR FLOW arrows, and continue out of enclosure through a connector 503 and into pneumatic tubing 502 at point B. Check valve 512 may be any device that allows air to flow through the check valve in the direction indicated by the AIR FLOW arrows, but does not allow air (or any fluid) to flow backwards through the check valve, i.e., the check valve does not allow any fluid to flow through the check valve in the direction that is opposite to the direction indicated by the AIR FLOW arrows. In embodiments, the check valve may be opened for allowing air flow in the direction indicated by the AIR FLOW arrows once the pressure in pneumatic tubing 514 reaches a desired PSI. Check valve 512 may be of any type, such as, for example, spring-loaded ball check valve, diaphragm check valve, swing check valve, tilting-disk check valve, stop check valve, lift check valve, in-line check valve, duckbill check valve, or reed check valve. Blower assembly enclosure 501 may comprise a handle 504, located on any surface, in order to facilitate carrying by a user.

Figure 5:
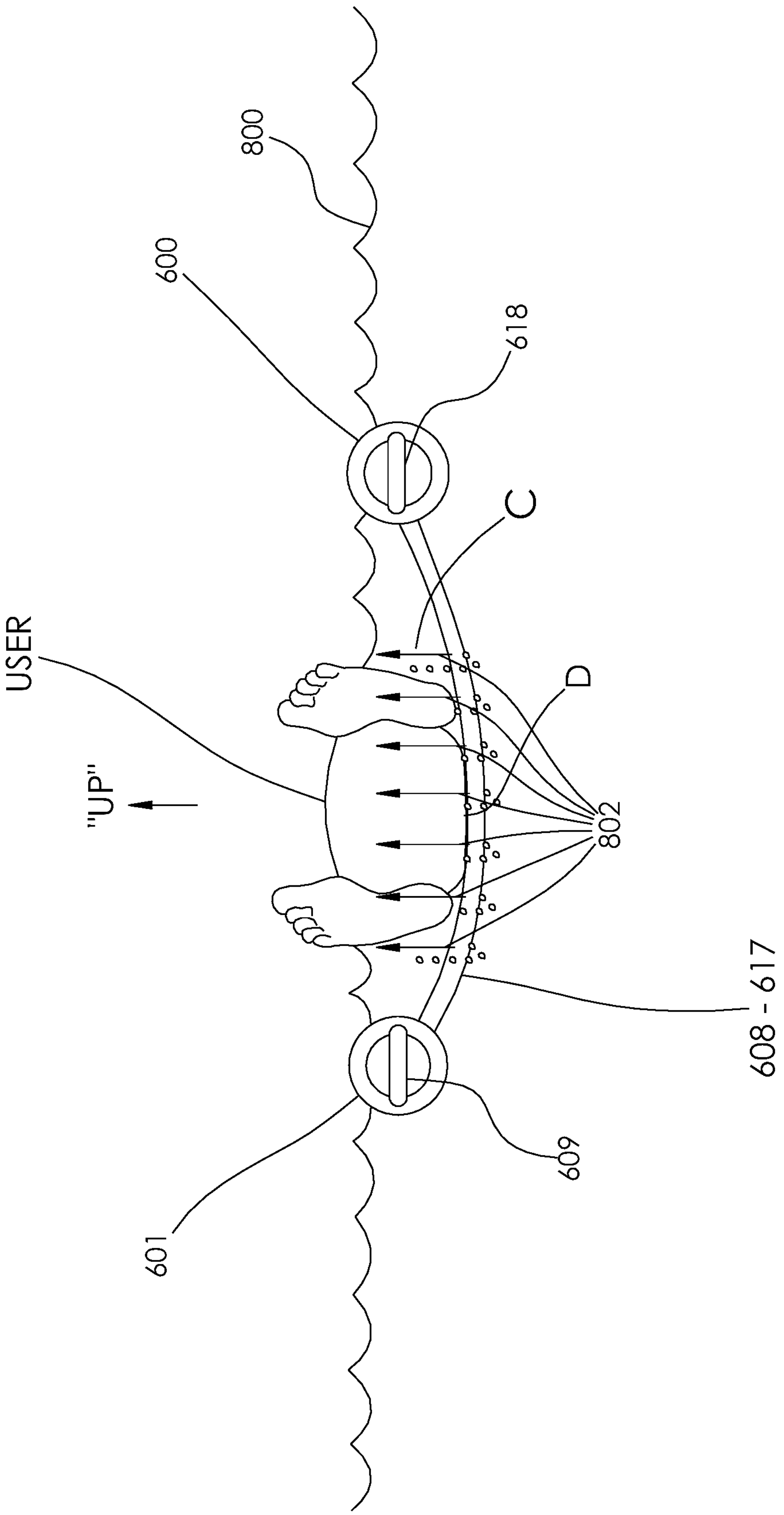
FIG. 5 depicts an end view of an embodiment of the bubble massage float apparatus of the invention being used by a user of the invention, the view being take from the foot end of the apparatus.

Referring now to FIG. 5, an end view of an embodiment of the bubble massage float apparatus of the invention being used by a user of the invention, the view being take from the foot end of the apparatus, is depicted. A user may be disposed in any manner, for example sitting, lying, reclining, etc. upon the bubble massage float apparatus of the invention, with the lower surfaces of their body D resting on one or more of bubbling connecting members 608-617 and possibly optional bubbling loop member 603 (not visible in FIG. 5, but depicted in FIG. 1). In the embodiments and use case in the view shown in FIG. 5, which is taken from the same end of the bubble massage float apparatus as FIG. 2, the user may have the lower surfaces of their head resting upon optional bubbling loop member 603. Float elements 600 and 601 are adapted to provide enough flotation to the bubble massage float apparatus such that the body weight of a user lying on, or otherwise disposed on, upper surfaces of the tubing comprising the invention will cause most, or in some cases, all of the bubble tubing 801 of the invention (see FIG. 3) to be submerged under water surface 800, such that, when the pneumatic and bubbling tubing comprising the bubble massage float apparatus are pressurized with a gas by air blower 506 (see FIG. 4), bubbles 803 (see FIG. 3) escaping the bubble openings 802 in bubble tubing 801 forming the bubbling connecting members 608-617 will impact and rise along portions of the epidermis, or skin, of the user in up in the direction of arrow C on their way to water surface 800, creating a therapeutic bubble massage effect on the user. In embodiments in which optional air heater 508 (see FIG. 4) is used, the therapeutic effect is enhanced by the heated air forming air bubbles 803. In embodiments in which the optional aroma infuser 510 (see FIG. 4) is used and is operative, the therapeutic effect is enhanced by the aroma carried by the scented air forming air bubbles 803. Pneumatic tubing 618 and 619 are shown for reference.

Figure 6:
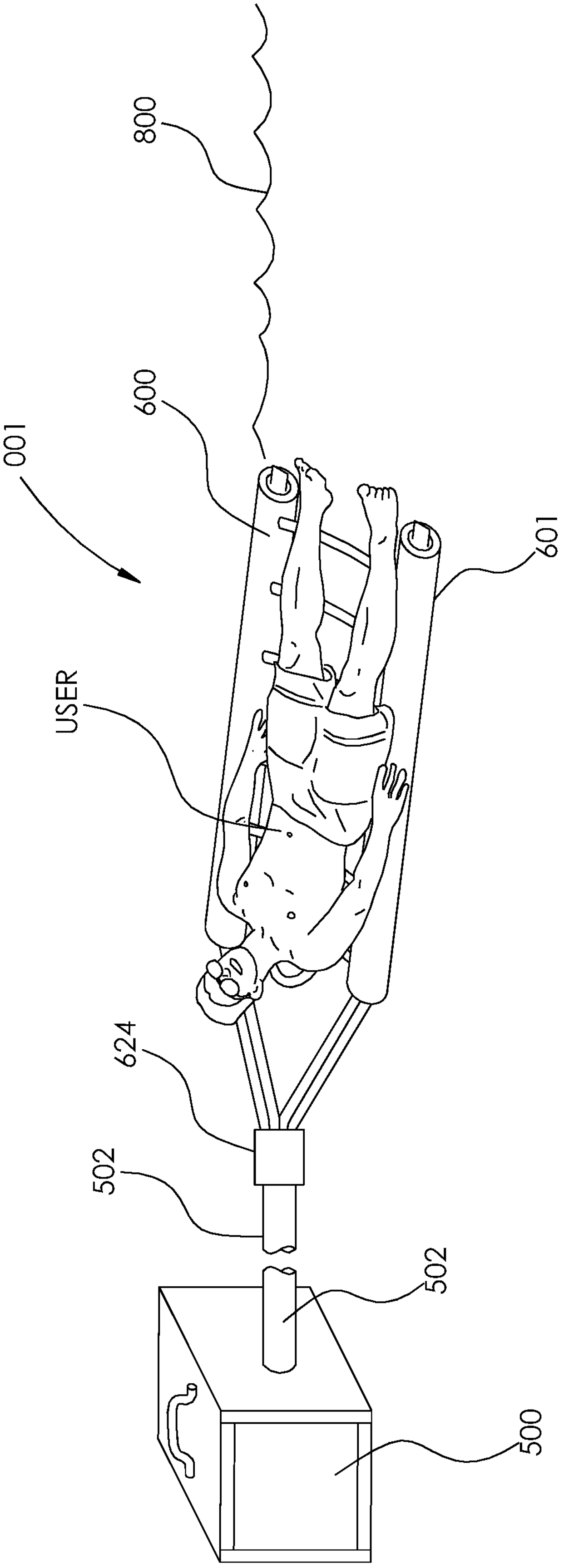
FIG. 6 depicts a perspective view of an embodiment of the bubble massage float apparatus and system of the invention being used by a user of the invention. In this case, the user is lying upon the bubble massage float apparatus.

Referring now to FIG. 6, the bubble massage apparatus of the invention 001 may comprise an air blower assembly 500 in communication with a manifold 624 via pneumatic tubing 502. Manifold 624 may operate as a 1:n splitter of the pressurized gas provided by air blower assembly 500 such that incoming gas, which may be, for example, air, is divided into a plurality of output ports attached to pneumatic tubing 604, 605, 606 and 607 as depicted in FIG. 1. As mentioned above, in the exemplary embodiments depicted in the drawings, manifold 624 may operate as a 1:4 splitter, but, generally, manifold 624 may be of any splitting ratio 1:2, 1:3, 1:4, 1:5, 1:6, and so on. I.e., "n" may be any number 1, 2, 3, 4, 5, 6 and so on. Float elements 600 and 601 are adapted to provide enough flotation to the bubble massage float apparatus such that the body weight of a user lying or otherwise disposed on one or more upper surfaces of the pneumatic or bubbling tubing comprising the invention will cause most, or in some cases, all, of the bubble tubing 801 of the invention to be submerged under water surface 800, such that bubbles escaping the bubble openings 802 in bubble tubing 801 will impact and rise along the epidermis, or skin, of the user on their way to water surface 800.

Figure 7:
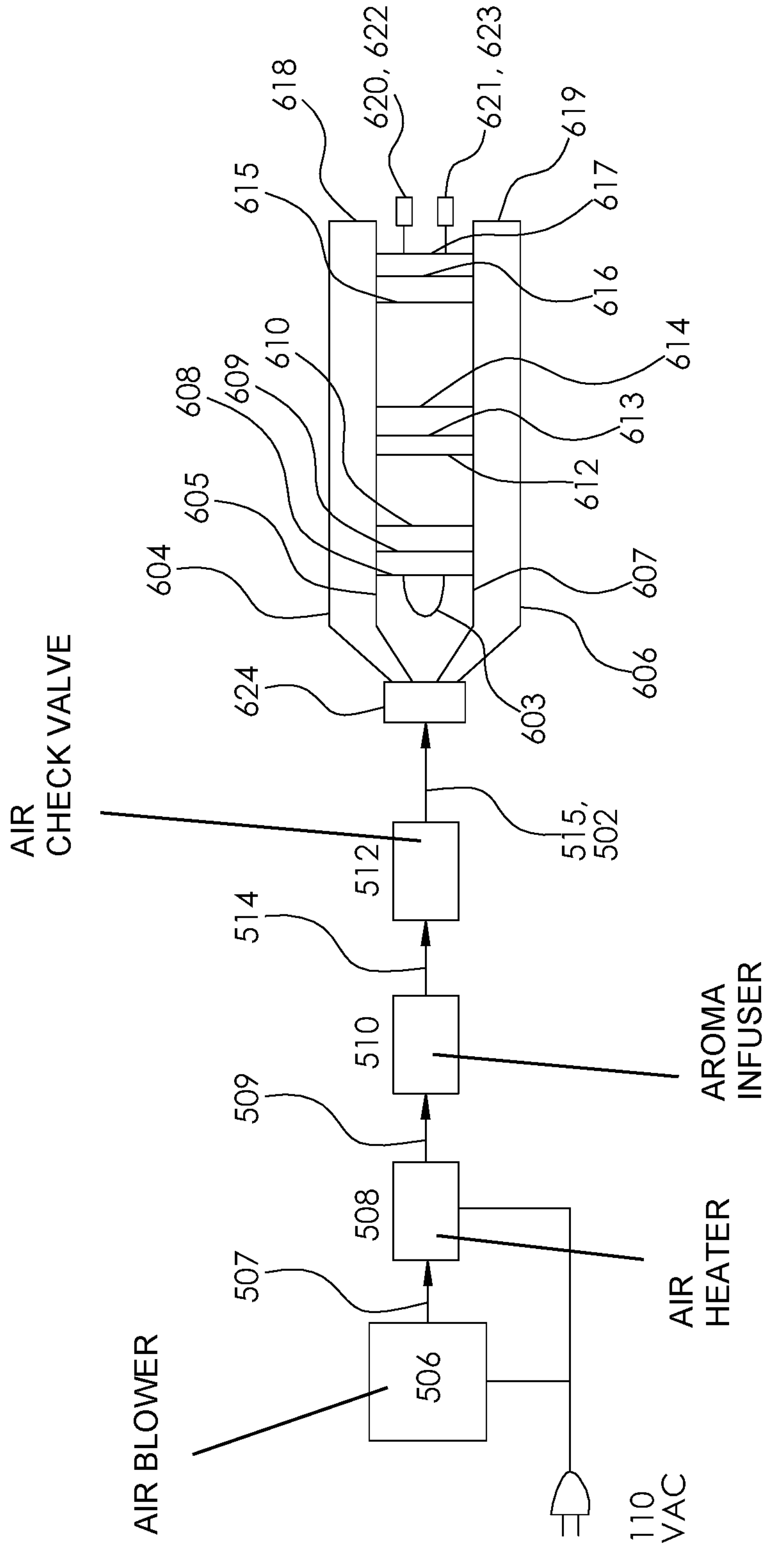
FIG. 7 depicts a pneumatic schematic of an embodiment of the bubble massage float apparatus and system of the invention being used by a user of the invention, showing the pneumatic interconnect between the elements comprising the bubble massage float apparatus and system of the invention.

Referring now to FIG. 7, a schematic diagram of the pneumatic system of an exemplary embodiment of the bubble massage float system of the invention is depicted. It is important to understand that the schematic shown in FIG. 7 represents just one of many embodiments, and that bubble massage float system of the invention having differing configurations and quantities of elements such as one or more air blower assemblies 506, one or more air heaters 508, one or more aroma infusers 510, pluralities of pneumatic tubing, pluralities of bubbling tubing, one or more manifolds, where, in the case of a plurality of manifolds, it is not necessary that each manifold be of the same splitting ratio, and where the aforementioned system elements are interconnected in any combination desired to meet the objects of the invention.

Still referring to FIG. 7, in the exemplary embodiment depicted, air blower (or air pump) 506 may be in pneumatic communication with optional air heater 508 via pneumatic tubing 507. In turn, optional air heater 508 may be in pneumatic communication with optional aroma infuser 510 via pneumatic tubing 509. In turn, optional aroma infuser 510 may be in pneumatic communication with optional air check valve 512 via pneumatic tubing 514. When air blower 506 is operating, air is forced through optional air heater 508, through optional aroma infuser 510, through optional air check valve 512, and into manifold 624 via pneumatic tubing 515 or 502, where manifold 624 splits the air flow into tubing 604, 605, 606 and 607, thus pressurizing the interior volumes of tubing 604, 605, 606 and 607, as well as pneumatic tubing 618 that is in pneumatic communication with, and pneumatically connects, pneumatic tubing 604 and first pneumatic tubing 605; and pneumatic tubing 619, that is in pneumatic communication with, and pneumatically connects, pneumatic tubing 606 and second pneumatic tubing 607. Each of the bubbling tubing elements 608-617 may have a first end in pneumatic communication with first pneumatic tubing 605 and a second end in pneumatic communication with second pneumatic tubing 607. Thus, when the interior volumes of pneumatic tubing 604, 605, 606 and 607 are pressurized by air forced into them through manifold 624 from air pump (or blower) 506, the interior enclosed volumes of bubbling tubing elements 608-617 are also pressurized. Bubbling loop member 603 may comprise a length of bubble tubing 801 forming a U-shape, or loop shape as depicted, having two ends, each end in pneumatic communication with bubbling connecting member 608 such that, when bubbling tubing element 608 is pressurized, optional bubbling loop member 603 is also pressurized. As described elsewhere herein, when bubbling tubing members 608-617 and 603 are pressurized with air forced into their enclosed interior volumes by air pump (or blower) 506, air is allowed to escape from bubbling tubing members 608-617 and 603 through bubbling openings 802, which may be present in any number or location, thus producing air bubbles that bubble along, and up between, the various elements of the invention, where they may impact the epidermis of one or more users disposed on the invention, resulting in a pleasant or therapeutic bubbling massage effect on the user or users. Optional pneumatic tubing stubs 620 and 621 and their removable caps 622 and 623 are shown for reference. While a certain number of bubbling tubing members 603 and 608-617 are depicted and described herein, it is to be understood that any number or configuration of such members are within the scope of the description and claims. The embodiment shown and described is merely exemplary in nature and has been chosen as a representative non-limiting example for purposes of describing the invention and explaining its operation. Blower 506 may be powered from any electrical power source such as, but not limited, 110 VAC or other voltage house electrical power, batteries, solar cells or any other source of electrical power.

In the various embodiments of the bubble massage float system of the invention, the order of optional air heater 508 and optional aroma infuser 510 may be reversed from the order depicted in the figures. Although a preferred embodiment may place optional air heater 508 before optional aroma infuser 510 so that the air passing through optional aroma infuser 510 is heated, and may therefore be more efficient at absorbing the scent from the aroma elements comprising optional aroma infuser 510, this order is not necessary, and arrangement and order of these elements may be selected as desired by the user.

Figure 8A:
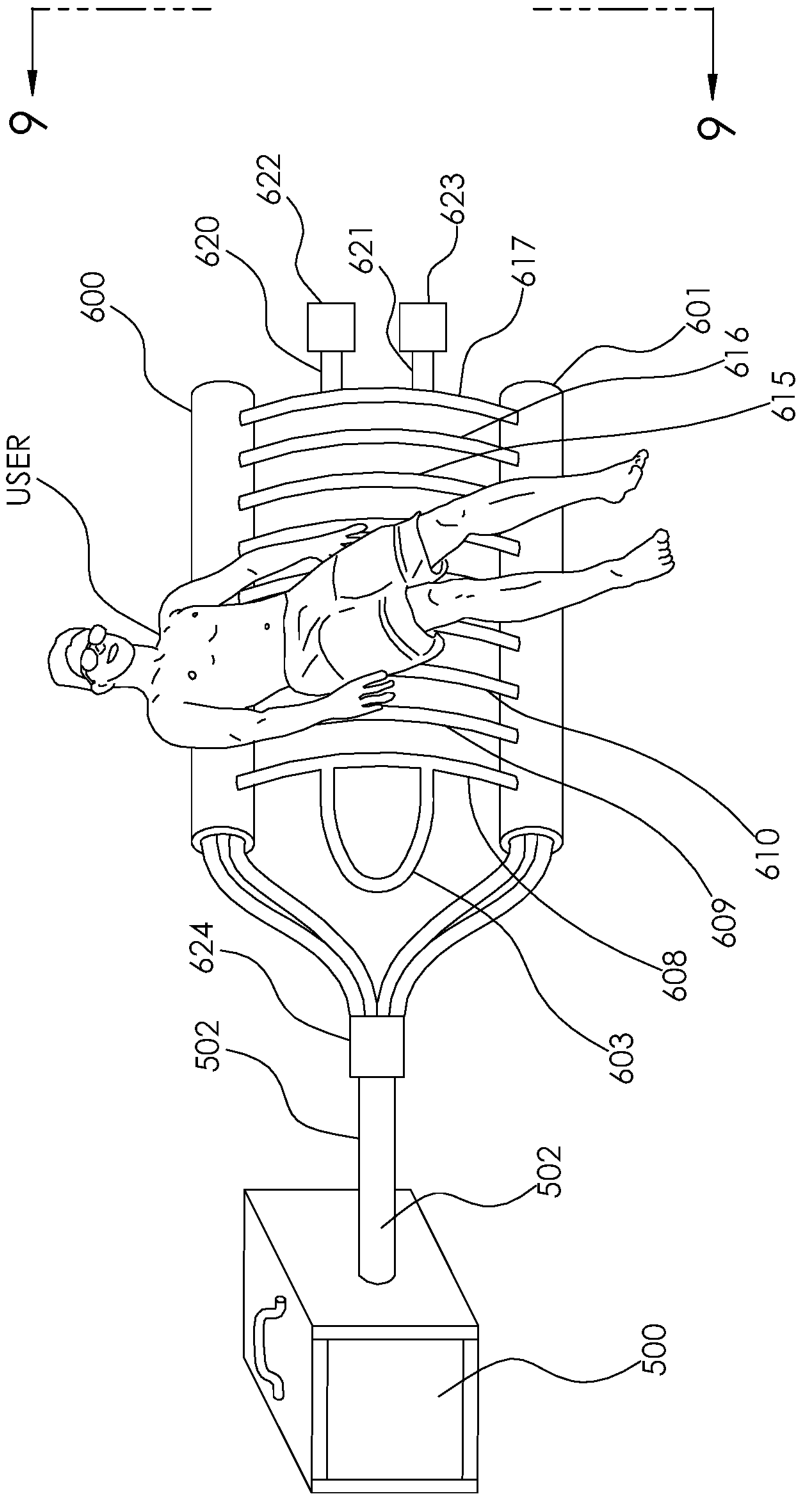
FIG. 8A depicts a perspective view of an embodiment of the bubble massage float apparatus and system of the invention being used by one or more users of the invention in an alternate use case.
Figure 9:
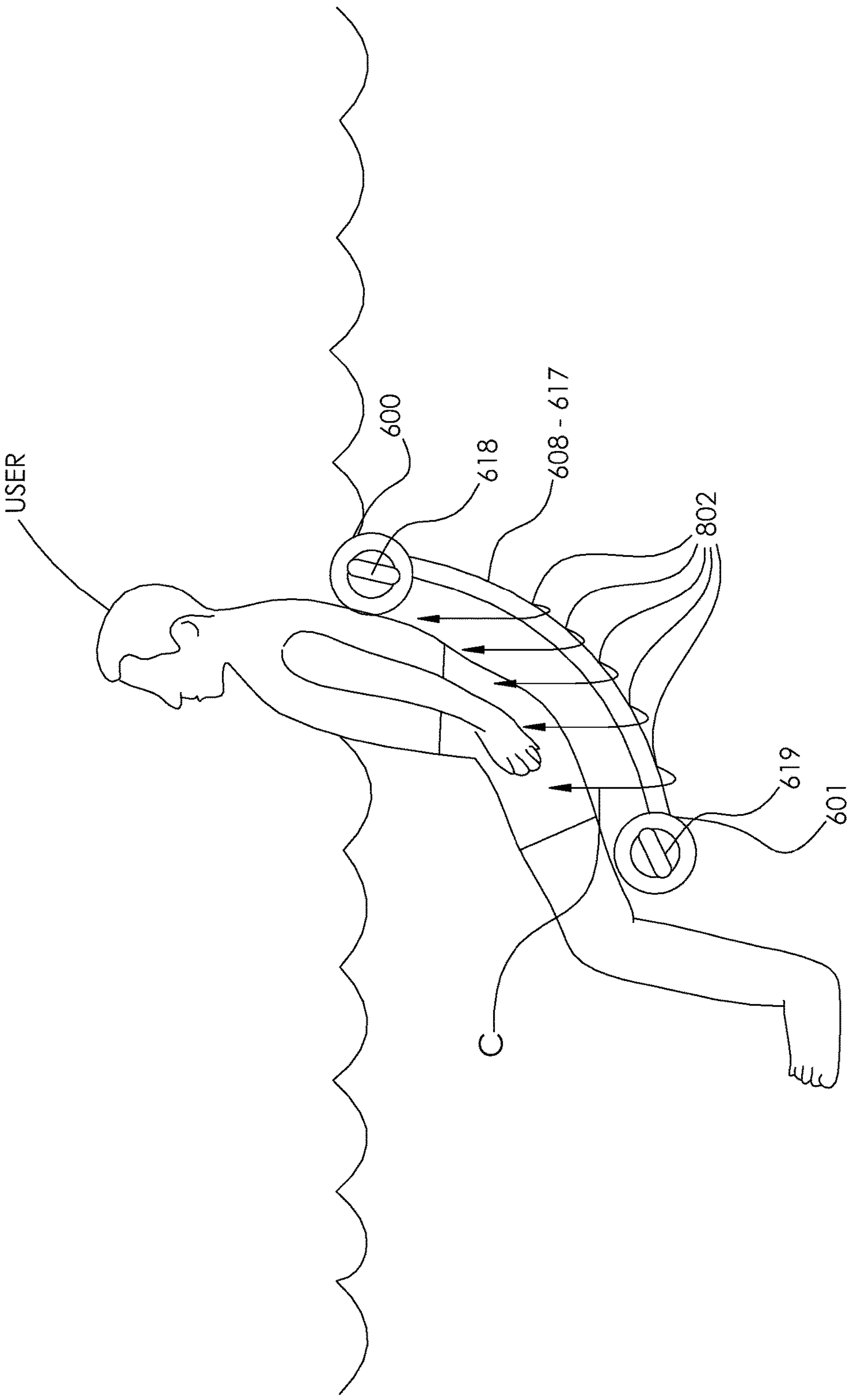
FIG. 9 depicts a side view of an embodiment of the bubble massage float apparatus and system of the invention being used by one or more users of the invention in an alternate use case. In this case, the user is sitting on the bubble massage float apparatus.

Referring now to FIGS. 8A and 9, an alternate use case of the bubble massage float apparatus is shown. In this use case, one or more users may sit with their posterior on or near flotation element 601, and with their back or shoulders resting against flotation element 600. In this use case, the user(s) do not utilize bubbling loop member 603 as a headrest, but rather the user makes use of the bubble massage float apparatus more in the form of a bubbling massage chair as been see in FIG. 9. Air blower assembly 500, pneumatic tubing 502 which communicates pressurized air to the pneumatic and bubbling tubing of the bubble massage float apparatus, manifold 624, bubbling connecting pneumatic tubing 608-617, and bubbling loop member 603, are shown for reference. Optional pneumatic tubing stubs 620 and 621 and their removable caps 622 and 623 are also shown for reference.

Figure 8B:
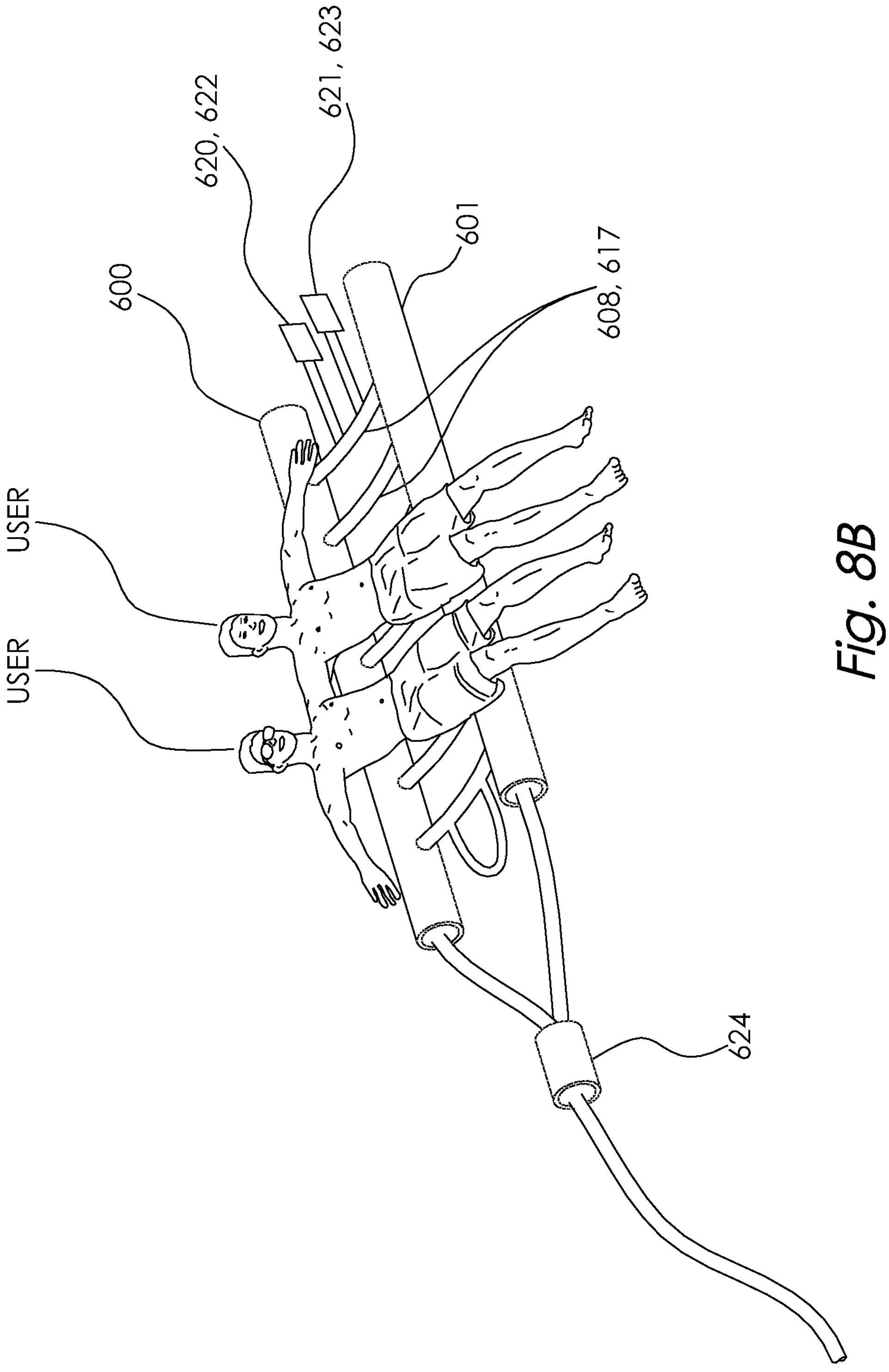
FIG. 8B depicts a perspective view of an embodiment of the bubble massage float apparatus and system of the invention being used by one or more users of the invention in an alternate use case.

Referring now to FIG. 8B, a further alternate use case of the bubble massage float apparatus is shown. In this use case, one or more users may sit with their posterior on or near bubbling connecting pneumatic tubing 608-617. In this use case, the user(s) do not utilize bubbling loop member 603 as a headrest, but rather the user makes use of the bubble massage float apparatus more in the form of a bubbling massage chair. Flotation elements 600 and 601, manifold 624, bubbling connecting pneumatic tubing 608-617, and bubbling loop member 603, are shown for reference. Optional pneumatic tubing stubs 620 and 621 and their removable caps 622 and 623 are also shown for reference.

Referring now to FIG. 9, a side view of the alternate use case depicted in FIG. 8 is shown. The user may use the bubble massage float apparatus essentially as a chair or equivalent structure because most of the body weigh of the user is supported by flotation element 601, which, due to the body weight of the user acting upon it, is disposed lower in the water than flotation element 600. Thus flotation element 601, and in some cases and to some extent, bubbling connecting pneumatic tubing 608-617, act to support, or even cradle the posterior, lower back and, in some cases, lower extremities of the user. In this use case, pressurized air escaping the openings 802 in the bubbling tubing elements that form bubbling connecting pneumatic tubing 608-617 may rise toward the surface of the water as indicated by the arrow C, impacting and rising along the epidermis of the back, arms, neck and head of the user, resulting in a therapeutic bubble massage effect on the user's epidermis. Pneumatic tubing 618 and 619 are shown for reference.

Figure 10:
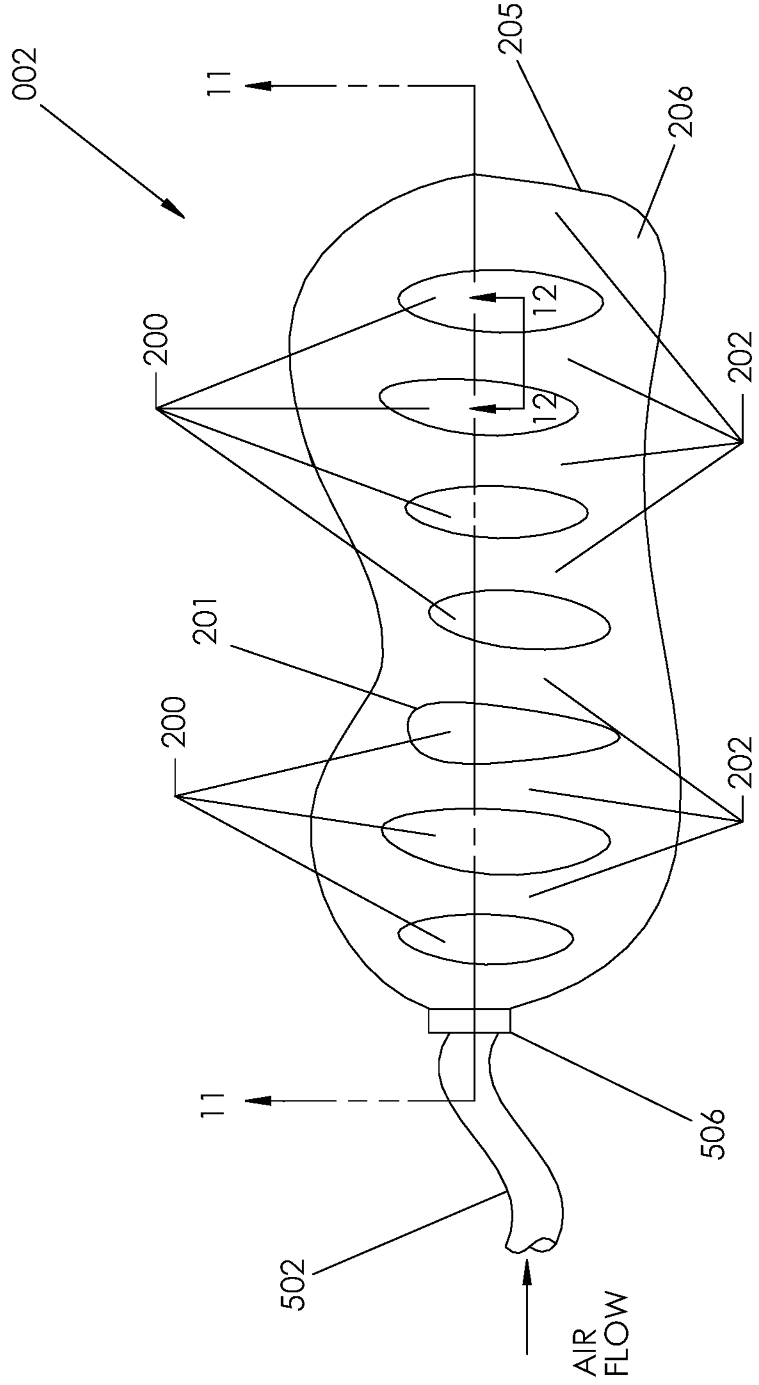
FIG. 10 depicts a top view of an embodiment of the invention comprising a sealed bladder with openings allowing bubbled to bubble up through the water. The bubbles may escape from small openings, or orifices, which may be located on any surface or surfaces of the bladder, but, in embodiments, the orifices may be located on one or more underneath surfaces of the bladder.
Figure 11:
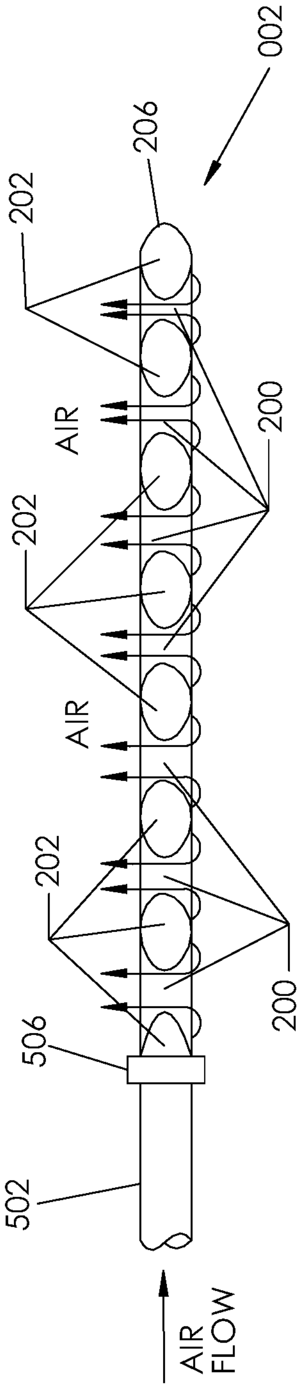
FIG. 11 depicts a cross section view of the embodiment of the invention depicted in FIG. 10.
Figure 12:
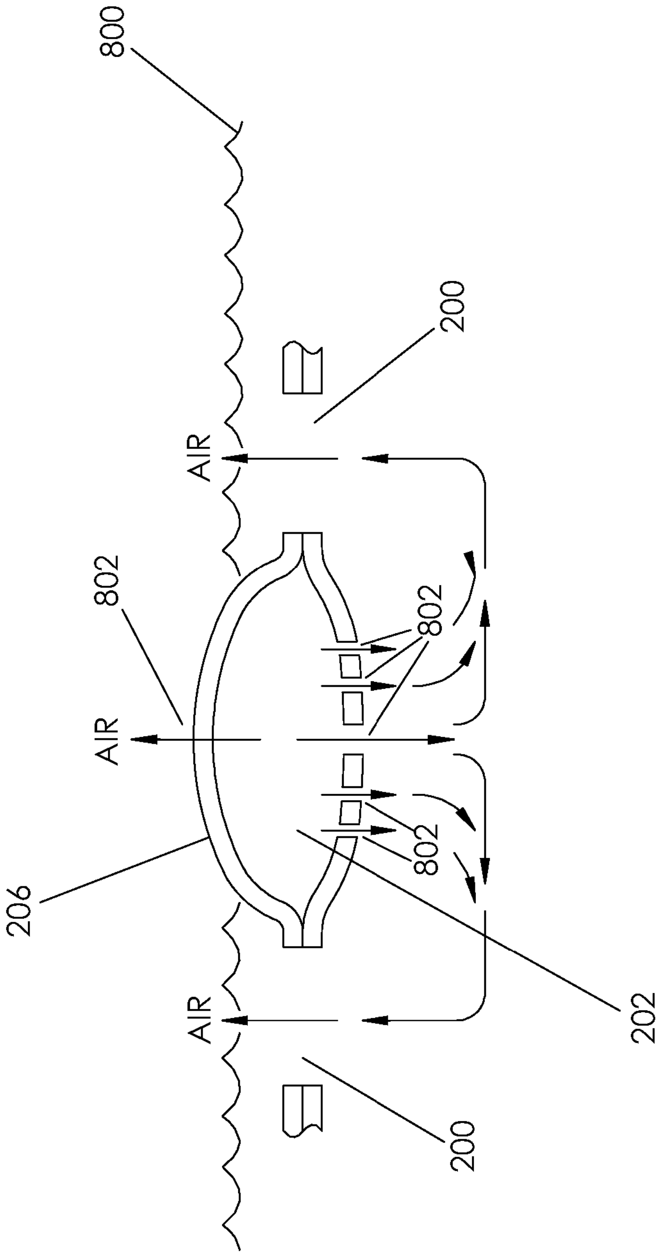
FIG. 12 depicts an expanded cross section view of an embodiment of a bladder portion of the embodiment of the invention depicted in FIG. 10.

Referring now to FIGS. 10 and 11, an inflatable bladder embodiment 002 of the invention is depicted, comprising a bladder having an enclosed interior volume 202. Bladder 002 may comprise openings 200 having sealed peripheries 201 that allow bubbles escaping through bubble openings 802 on an underneath portion of inflatable bladder 206 to travel through bladder voids 200 upwards through the water to contact a user disposed on top of the bubble massage float of the invention 002. Each of the bladder voids 200 may be sealed around their periphery so that no air escapes from the bladder interior volume when the bladder interior volume is pressurized by forced air flowing in from pneumatic tubing 502, except through bubble openings 802. Pneumatic tubing 502 may be attached to, and in pneumatic communication with, bladder 206 via coupling 506 such that air flowing into inflatable bladder 206 through pneumatic tubing 502 tends to inflate and to pressurize bladder 206. The bladder periphery 205 may have any shape such as, for example, free-form, amorphous, rectangular, elliptical, circular, oval, square or any other desired shape. The bladder 206 may comprise any plastic material, including but not limited to PVC sheet material, or any other material that is able to be formed into a flexible bladder. Inflatable bladder 206 may be fabricated by any known method, including but not limited to top and bottom flat patterns that are attached and sealed along their periphery by any known means such as, for example, chemical bonding, heat welding, ultrasonic welding, or any other attachment means. The bladder 206 may contain a plurality of bubble openings 802 on any surface, upper or lower, in any number and in any configuration or pattern, for example as depicted in FIG. 12. The inflatable bladder embodiment 002 of the invention has the advantage of being foldable when not in use, reducing storage volume requirements. In this embodiment of the invention, the invention may be described as a system for providing bubble massage therapy to the epidermis of a user, comprising: a floating bubble massage apparatus 002 comprising at least one bubbling element 206; wherein the at least one bubbling element 206 is in pneumatic communication with an air pump 506 (see FIG. 7) for pressurizing an interior volume 202 of the at least one bubbling element 206 (see FIG. 12), the bubbling element 206 comprising a plurality of bubbling openings 802 (see FIG. 12) for producing air bubbles when the interior volume 202 of the bubbling element 206 is pressurized by air pumped by the air pump 506 and submerged in a liquid; and wherein the at least one bubbling element 206 is defined as an inflatable bladder, and wherein the plurality of openings 802 may be, but are not necessarily, disposed in an underneath surface of the inflatable bladder such that, when the bubbling element 206 is at least partially submerged in a body of water by the weight of a user disposed on the inflatable bladder 206, bubbles are produced by air from the interior volume 202 escaping the plurality of bubbling openings 802, the bubbles traveling along the underneath surface of the inflatable bladder 206 and then rising up from around the inflatable bladder 206, or through openings 200, to impact the epidermis of a user, creating a therapeutic effect on the user.

Referring now specifically to FIG. 11, a cross section view of an inflatable bladder embodiment 002 of the invention is depicted, comprising a bladder having an enclosed interior volume 202. In the embodiment depicted in FIG. 11, air bubble openings 802 are shown as being disposed on an underneath surface of inflatable bladder 206 allow pressurized air in bladder interior volume 202 to escape bladder interior volume 202 through bladder openings 802 to travel through bladder voids 200 upwards to contact a user disposed on top of the bubble massage float of the invention 002 thereby providing a relaxing and/or therapeutic bubble massage effect to a user disposed on a top surface of the invention. While bubble, or bubbling, openings 802 are shown as being disposed on an underneath surface of inflatable bladder 206 in FIG. 11, bubble openings 802 may be disposed in any surface of inflatable bladder 206 as may be desired in order to achieve the pleasing and therapeutic bubble massage therapy for a user.

Referring now to FIG. 12, a cross section of an embodiment of the invention 002 showing a portion of inflatable bladder 206 as shown in FIG. 11 is depicted, in which pressurized air inside the bladder enclosed interior volume 202 escapes through bubble openings 802 allowing air (represented by arrows in the figures) to escape the bladder enclosed interior volume 202 to travel in the direction of the arrows along the underneath surface of inflatable bladder 206 and to rise up through bladder voids 200 towards the surface of the water 800 where they impact a portion of a body of a user disposed on the inflatable bladder, providing a pleasing or therapeutic effect to the user. While bubble openings 802 are depicted as located on an underneath surface of inflatable bladder 206 in the figure, it is to be understood that bubble openings 802 may be located on any surface or surfaces of inflatable bladder 206, in any number and in any configuration. While bubble, or bubbling, openings 802 are shown as being disposed on an underneath surface of inflatable bladder 206 in FIG. 12, bubble openings 802 may be disposed in any surface of inflatable bladder 206 as may be desired in order to achieve the pleasing and therapeutic bubble massage therapy for a user.

Figure 13:
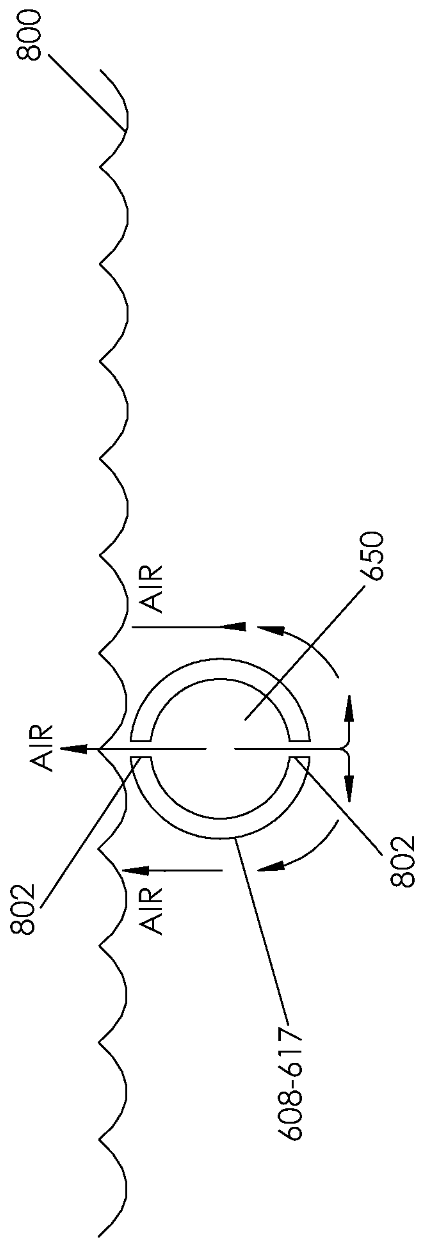
FIG. 13 depicts an embodiment of an expanded cross section view of tubing members 608-617, or any tubing of the invention.

Referring now to FIG. 13, a cross section of a bubbling tubing element such as 608-617 as shown in FIG. 1 is depicted, in which pressurized air inside the tubing element 608-617 escapes through bubble openings 802 allowing the pressurized air (represented by arrows in the figures) to escape the tubing element enclosed interior volume 650 to travel in the direction of the arrows along the underneath side of the tubing members 608-617 and to rise up around tubing members 608-617 towards the surface of the water where they impact a portion of a body of a user disposed on the tubing elements, providing a pleasing or therapeutic effect to the user. Bubble openings 802 may be located on any surface or surfaces of bubbling tubing element 608-617, in any number and in any configuration. I.e. the cross-section view of FIG. 13 is exemplary in nature. In embodiments, the bubble openings 802 may be solely disposed in underneath surfaces of the bubbling elements, i.e., facing downward.

Figure 14:
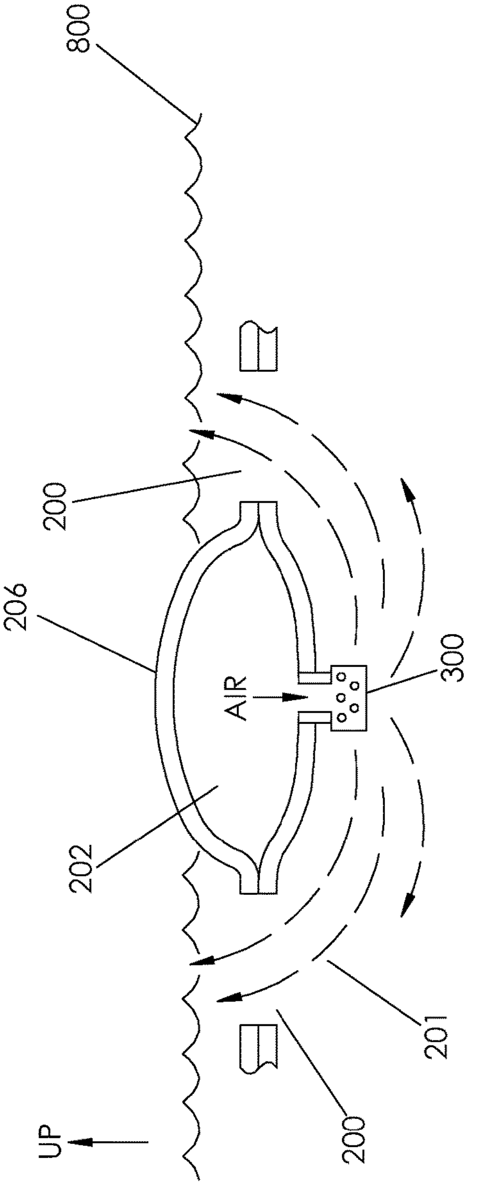
FIG. 14 depicts an expanded cross section view of an embodiment of a bladder portion of the embodiment of the invention depicted in FIG. 10 in which an optional air diffuser is utilized to diffuse air bubbles that are inserted into the water.

Referring now to FIG. 14, an embodiment of the invention comprising air diffusers as may be used in an inflatable bladder embodiment of the invention is depicted. Pressurized air in bladder interior volume 202 may escape bladder interior volume 202 through one or more air diffusers 300, which may be in pneumatic communication with bladder interior volume 202, creating diffused air bubbles that travel through bladder voids 200 upwards 201 towards the surface of the water 800 to contact a user disposed on top of the bubble massage float of the invention 002 thereby providing a bubble massage effect to a user disposed on a top surface of the invention. The one or more air diffusers 300 may be attached to any surface of inflatable bladder 206, in any location or pattern, and in any number.

In any of the embodiment that comprise air diffusers 300, air diffuser 300 may comprise any material that is able to receive pressurized air, and to output diffused air bubbles that are smaller in cross section than un-diffused air bubbles. Diffused air bubbles may be desirable by some users as opposed to un-diffused air bubbles in that some users may find that diffused bubbles have a great pleasurable or therapeutic effect. As a non-limiting example, the one or more air diffusers 300 may comprise porous material such as a porous stone or lime wood. In any of the embodiments that comprise air diffusers 300, bubble openings 802 may also be present, in any number and in any configuration. In other words, embodiments of the invention may comprise only bubble openings 802 (in any number and in any configuration), only air diffusers 300 (in any number and in any configuration), or a combination of bubble openings 802 and air diffusers 300 (in any number and in any configuration).

Figure 15:
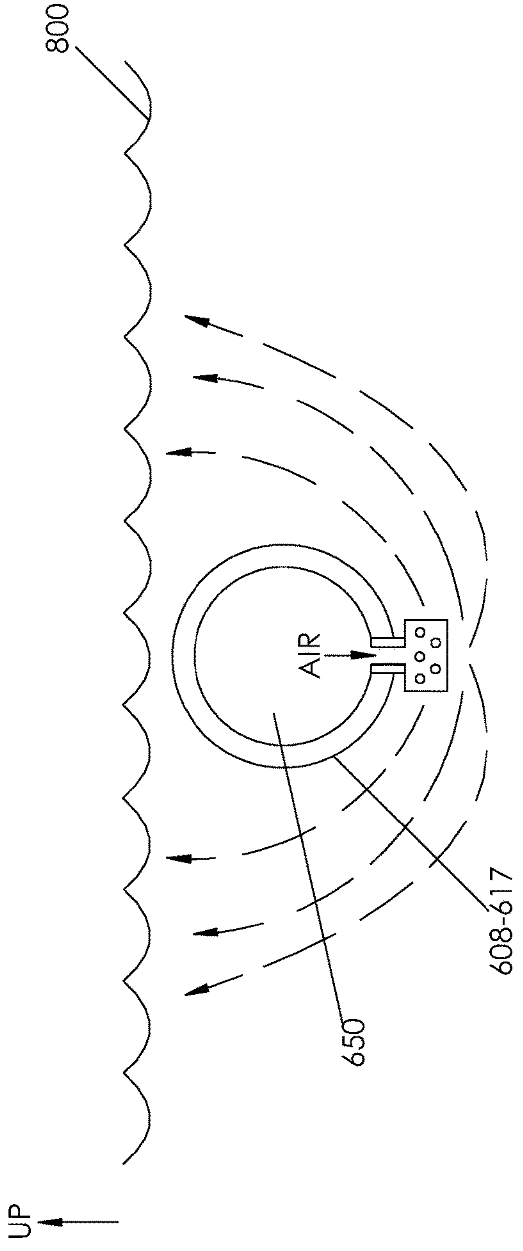
FIG. 15 depicts an embodiment of an expanded cross section view of tubing members 603 and 608-617, or any tubing of the invention, in which an air diffuser is utilized to diffuse air bubbles that are inserted into the water.

Referring now to FIG. 15, an embodiment of the invention comprising air diffusers as may be used in a tubing embodiment (for example, as depicted in FIG. 1) of the invention is depicted. Pressurized air in tubing member interior volume 650 may escape tubing member interior volume 650 through one or more air diffusers 300, which may be in pneumatic communication with tubing member interior volume 650, creating diffused air bubbles that travel underneath and between tubing members 608-617 upwards towards surface of the water 800 to contact a user disposed on top of the bubble massage float of the invention 001 thereby providing a bubble massage effect to a user disposed on a top surface of the invention. The one or more air diffusers 300 may be attached to, and in pneumatic communication with, any portion of the invention that contains pressurized air, including but not tubing members 608-617, in any location or pattern, and in any number.

In any of the embodiments of the invention, any of the elements of pneumatic tubing and bubbling tubing may be interconnected using quick-disconnect pneumatic connectors for ease of assembly, disassembly, transportation and storage.

In any of the embodiments of the invention, the elements described herein may be present in any quantity, and in any order.

In any of the embodiments of the invention, the invention may be sized and configured to accept one or more users who each enjoy the pleasing and therapeutic effects of the bubbling action as the bubbles of the invention impact their epidermis.

What is claimed is:

1. A system for providing bubble massage to the epidermis of a user, comprising:

a floating bubble massage apparatus, comprising an inflatable bladder;

wherein said inflatable bladder is in pneumatic communication with an air pump for pressurizing an interior volume of said inflatable bladder, said inflatable bladder comprising a plurality of openings for producing air bubbles when said interior volume of said inflatable bladder is pressurized by said air pump and submerged in a liquid; and wherein said inflatable bladder comprises voids having sealed peripheries, wherein said bubbles are able to escape from said openings and rise through said voids to impact the portion of epidermis of the user;

wherein said plurality of openings are disposed in a lower-most surface of the inflatable bladder such that, when the inflatable bladder is at least partially submerged in a body of water by the weight of a user disposed on the inflatable bladder, bubbles are produced by air from the interior volume escaping said plurality of openings in the lower-most surface, creating a therapeutic effect on a user when the bubbles rise through the water and around the bladder to impact a portion of the epidermis of the user.

2. The system of claim 1, further comprising an air heater positioned between said air pump and said inflatable bladder, wherein air from said air pump is passed through said air heater before passing into said inflatable bladder, heating said air bubbles.

3. The system of claim 2, wherein said air heater is further defined as a controllable air heater that is adapted to maintain a temperature of said air from said air pump in a range between a desired lower heated temperature and a desired upper heated temperature.

4. The system of claim 1, further comprising an aroma infuser, wherein said aroma infuser is positioned between said air pump and said inflatable bladder;

wherein air from said air pump is passed through a basket containing scented elements, such that said air becomes scented air before passing into said inflatable bladder.

5. The system of claim 1, wherein said inflatable bladder is in pneumatic connection with said air pump via pneumatic tubing.

6. The system of claim 5, wherein said pneumatic connection comprises a pneumatic connector.

7. The system of claim 1, wherein said voids is further defined as consisting essentially of seven separate voids.

8. The system of claim 1, wherein the inflatable bladder is constructed out of PVC sheet material.

* * * * *